M. ANDERSON.
HAY SWEEP.
APPLICATION FILED JUNE 8, 1917.

1,281,477.

Patented Oct. 15, 1918.
3 SHEETS—SHEET 1.

WITNESSES

Inventor
Mads Anderson
By
Attorneys

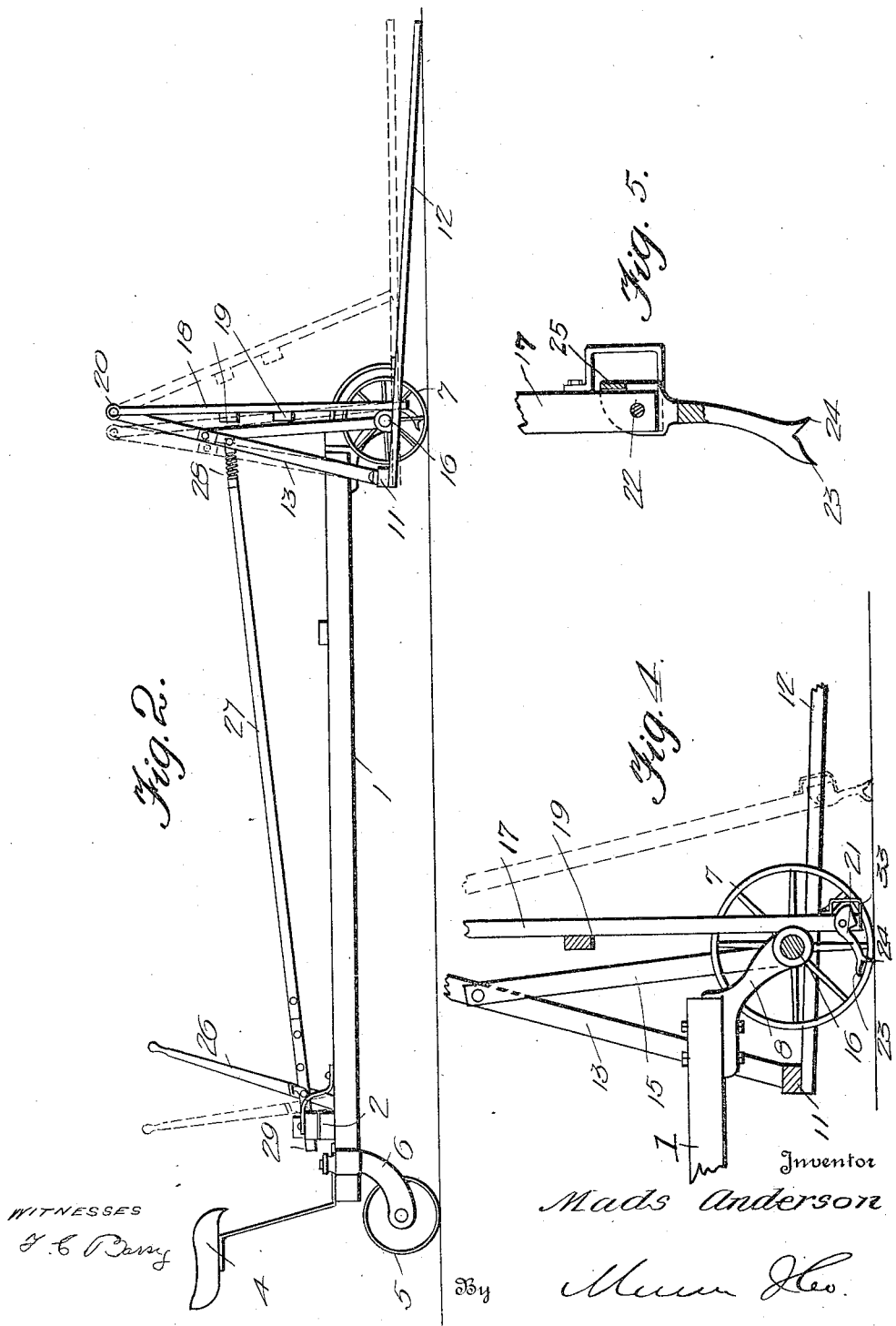

M. ANDERSON.
HAY SWEEP.
APPLICATION FILED JUNE 8, 1917.

1,281,477.

Patented Oct. 15, 1918.
3 SHEETS—SHEET 3.

WITNESSES
F. B. Barry

Inventor
Mads Anderson
By Munn & Co.
Attorneys

UNITED STATES PATENT OFFICE.

MADS ANDERSON, OF HASTINGS, NEBRASKA.

HAY-SWEEP.

1,281,477.  Specification of Letters Patent.  Patented Oct. 15, 1918.

Application filed June 8, 1917. Serial No. 173,586.

*To all whom it may concern:*

Be it known that I, MADS ANDERSON, a citizen of the United States, and a resident of Hastings, in the county of Adams and State of Nebraska, have invented new and useful Improvements in Hay-Sweeps, of which the following is a specification.

My invention is an improvement in hay sweeps, and has for an object to provide a sweep of the character specified, wherein means is provided for varying the angle of the plane of the teeth with respect to the ground, and wherein means is provided for insuring the positive unloading of the sweep when it is moved rearwardly.

In the drawings:

Fig. 2 is a side view;

Figure 1:
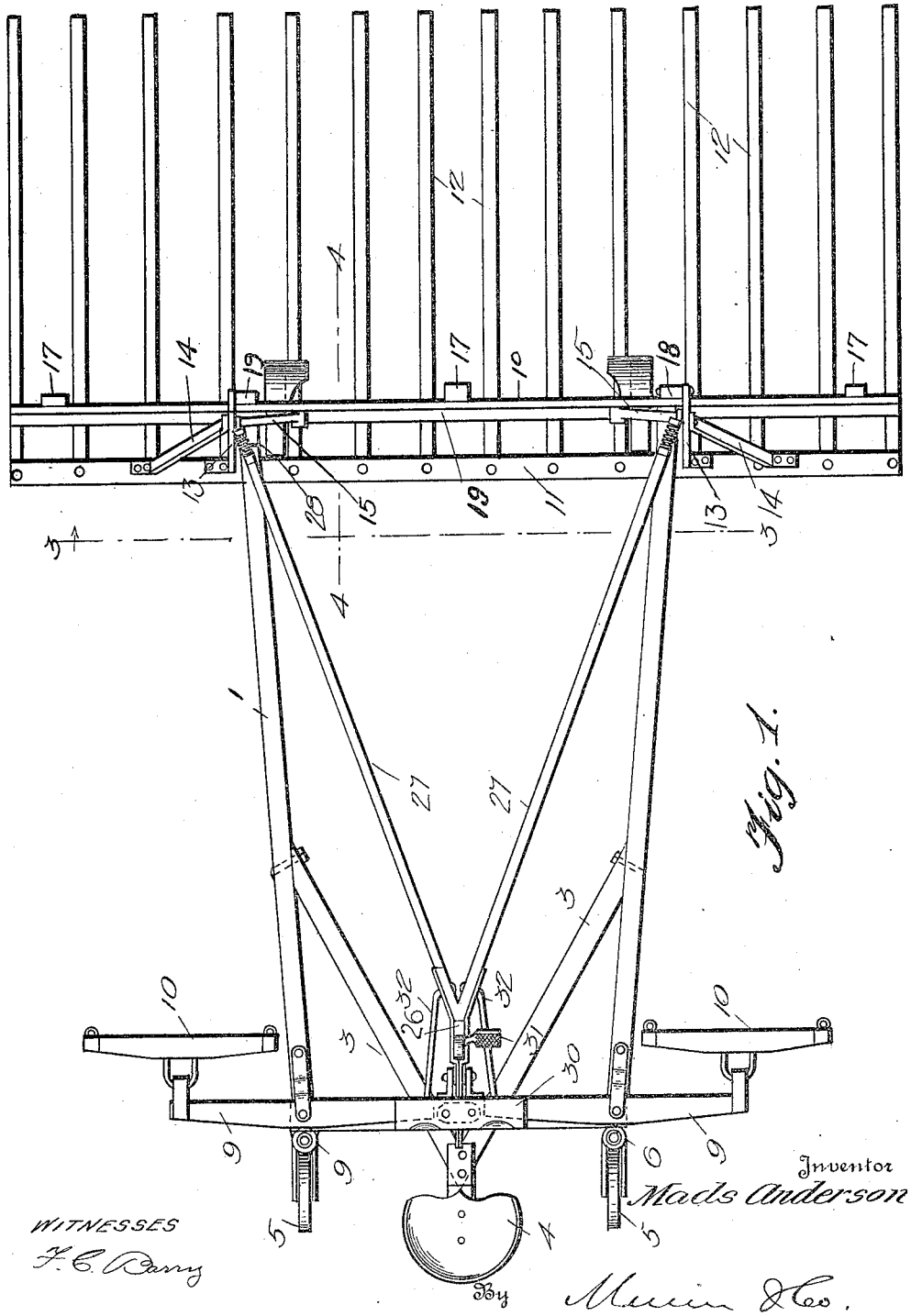
Figure 1 is a top plan view of the improved sweep.
Figure 5:
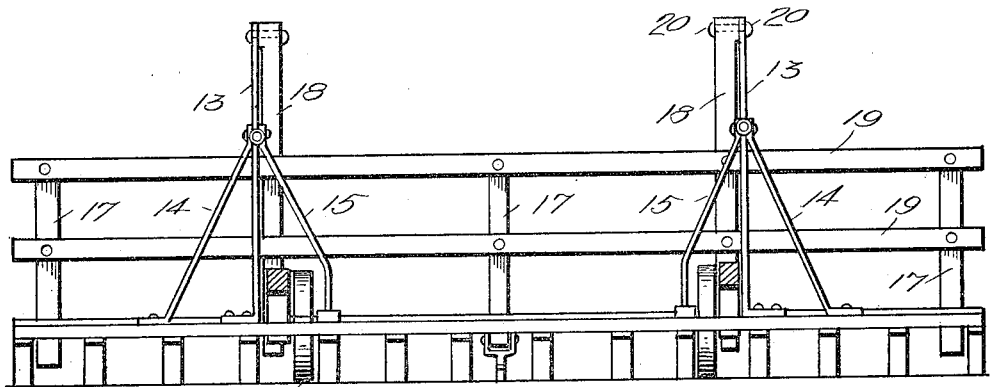
Figure 6:
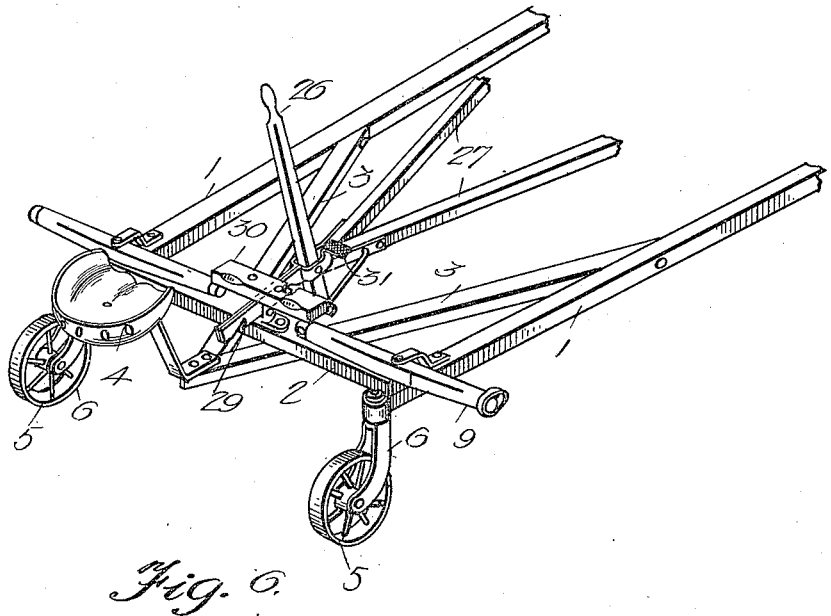

Figs. 3 and 4 are sections on the lines 3—3 and 4—4, respectively, of Fig. 1, each view looking in the direction of the arrows adjacent the line;

Fig. 5 is a sectional detail of a portion of Fig. 4, showing the parts in another position; and Fig. 6 is a perspective view of the rear of the seat, showing the operating mechanism for the teeth.

In the present embodiment of the invention, a frame is provided, consisting of longitudinally extending bars 1 which are connected at their rear by the cross bar 2, and brace bars 3 are provided, extending from the bars 1 inwardly and rearwardly, the said brace bars being connected to the cross bar 2 at approximately its center, and to each other in rear of the said bar, and a seat 4 is supported by the connected ends of the brace bars.

Caster wheels 5 are journaled at the rear corners of the frame, the said wheels being mounted in the arms of yokes 6, whose bodies are pivoted to the frame to permit the wheels to swing. Other wheels 7 are mounted at the front of the frame, the said wheels being journaled on an axle mounted in brackets 8 at the front ends of the bars 1.

Doubletrees 9 are arranged at the rear of the frame, the said doubletrees having at their outer ends swingletrees 10, to which the draft animals may be connected.

The rake for the hay comprises a body portion 11, which is provided with a series of forwardly extending teeth 12 arranged in spaced relation with respect to each other, and this rake is provided with forwardly inclined upstanding standards 13, each of which is braced by an inclined brace 14, the said braces being on the outer sides of the standards. Each standard is also braced on the inner side by a second brace 15, each of the said braces extending forwardly and inwardly to a connection with the axle 16 upon which the wheels 7 are journaled.

The sweep for dislodging the hay from the rake is composed of uprights 17 and 18 which are connected by cross plates 19. The uprights 17 are at the ends of the cross plates and intermediate the ends, while the uprights 18 are between the central and lateral uprights 17. The uprights 18 are pivotally connected to the upper ends of the standards 13, as indicated at 20, to permit the sweep to swing at its lower end, and the center upright 17 is provided at its lower end with a dog or catch 21. The said dog is pivotally connected to the upright, as indicated at 22, and has at its lower end two teeth 23 and 24, respectively, the tooth 24 being of less length than the tooth 23 and extending forwardly, while the tooth 23 extends rearwardly. The dog has a species of socket in its upper end for receiving the lower end of the upright, and a stop 25 is provided for limiting the forward swinging of the dog. The mechanism for varying the angle of the rake consists of a lever 26 which is pivoted at the rear of the frame in front of the seat, and this lever has pivotally connected therewith a pair of forwardly extending links 27. These links diverge toward their front ends, and each is connected to the adjacent standard 13 by a coil spring 28.

A latch bar 29 is connected with the lever, and the said bar extends rearwardly across the cross bar 2, between the said bar and the foot rest 30. The latch bar is pivoted to the lever, and a foot plate 31 extends laterally from the front end of the latch bar for engagement by the foot of the operator to lift the latch bar. The latch bar has teeth, as shown, for engaging a catch on the cross bar, and the latch will hold the teeth elevated or depressed, as indicated in dotted and full lines in Fig. 2.

Links 32 connect the inner ends of the doubletrees 9 with the links 27, so that the lifting of the rake after the load is picked up may be brought about by the draft animals on the swingletree.

In operation, the sweep gathers the load, with the parts in the full line position of Fig. 2. When the load has been gathered on the rake, the latch bar is released by pressing down on the foot plate 31, and the pull on the outer ends of the doubletrees will move the links 27 rearwardly, lifting the rake to elevate the load. When the place of delivery is reached, the weight of the load will depress the rake when the latch bar is disengaged, and when the frame is moved rearwardly the teeth 24 of the dog 21 will engage the ground, swinging the dog into the position of Fig. 5, where the teeth 23 will engage the ground, and will hold the sweep frame at its lower end, causing it to discharge the load, as indicated in dotted lines in Fig. 2.

When the sweep again moves forwardly after discharging the dog is released by the forward movement of the sweep. The upright 17 has a guard 33 at its lower end and at its front side to prevent the dog from becoming clogged.

The latch bar 29 has two catches or teeth, facing in opposite directions, the forward one for locking the teeth to the ground, and the rearward one for holding them lifted. With the improved sweep it is not necessary for the driver to help unload the hay, the unloading being entirely automatic. When the load of hay is in the position to be unloaded the mere backward movement of the sweep unloads the hay, and the forward movement returns the parts of the sweep-off mechanism to normal position.

I claim:

A device of the character specified comprising a wheel supported frame, a rake mounted at the front of the frame and extending forwardly therefrom and sweep-off mechanism supported at the rear of the rake and operated by the rearward movement of the frame, said sweep-off mechanism comprising a frame pivotally supported at its upper end by the rake and depending at its lower end between the teeth of the rake, and a dog pivoted to the lower end of the said frame near the center thereof and adapted to engage the ground to operate the sweep-off mechanism, the dog having teeth at its lower end, the teeth diverging, and the dog and frame of the sweep-off mechanism having coöperating mechanism to limit the forward swinging movement of the dog to a position in approximate alinement with the plane of the frame.

MADS ANDERSON.